April 9, 1929.  W. E. BLECHSCHMIDT  1,708,564
SIGNALING DEVICE
Filed Feb. 25, 1925
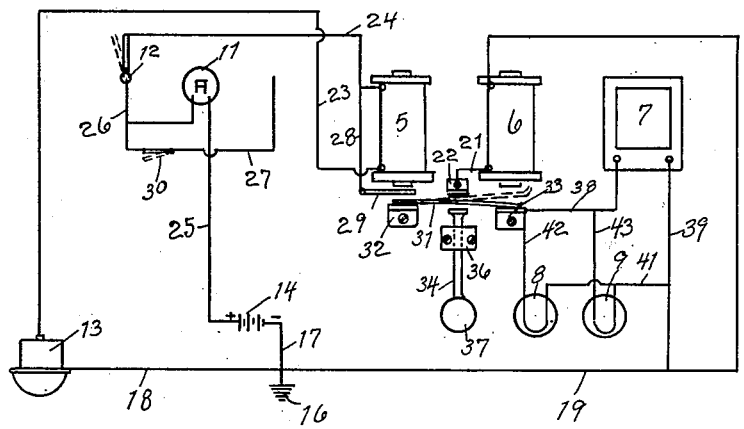
Fig. I.
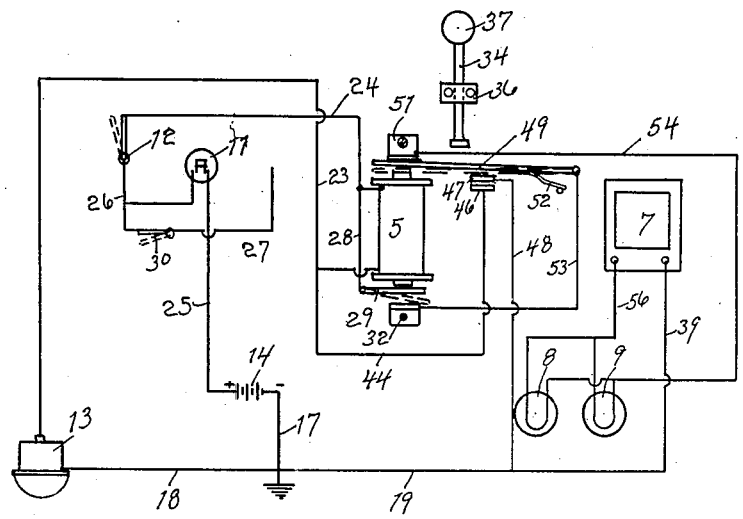
Fig. II.
INVENTOR.
W. BLECHSCHMIDT
BY Victor J. Evans
ATTORNEY Patented Apr. 9, 1929.

1,708,564

UNITED STATES PATENT OFFICE.

WILFRED E. BLECHSCHMIDT, OF SACRAMENTO, CALIFORNIA.

SIGNALING DEVICE.

Application filed February 25, 1925. Serial No. 11,555.

This invention relates to improvements in automobile signals such as a rear light and has particular reference to means for audibly and visibly indicating to the driver of the automobile the fact that the rear light has burnt out. It is of course obvious that this device might be used in other places to indicate the same trouble.

The principal object of this invention is to produce a simple and efficient device for audibly warning the driver of a vehicle that his rear light has become extinguished and to further provide visible means which will also warn him, and to still further provide means for deenergizing both signals.

Another object is to produce a device of this character which may be applied to the ordinary wiring system of an automobile without materially altering the present wiring.

A still further object is to produce a device which is compact, neat in appearance and simple in operation.

Other objects and advantages will be apparent during the course of the following description.

In the accompanying drawings forming a part of this specification and in which like numerals are employed to designate like parts throughout the same, Figure I is a schematic diagram of the wiring of my device employing the double electro-magnets, and Figure II is a view similar to Figure I showing the device employing a single electro-magnet.

At the present time when the rear light of an automobile becomes extinguished for some reason, such as burning out or breakage, there is no way of warning the driver and consequently he is subject to violation of the traffic laws by not having the rear light lit, as well as subject to collision with another vehicle.

It is applicant's intention to attach to the ordinary wiring system, a simple device wherein a magnet or magnets together with a buzzer or bell may be employed to warn the driver of the fact that his rear light has been extinguished, and to further provide warning lights which will also indicate this fact to him.

In accomplishing this, I mount upon the instrument board or at some convenient visible point electromagnets as shown in Figure I, which are indicated by the numerals 5 and 6, also a buzzer indicated at 7, together with warning lights which are shown at 8 and 9.

At 11, I have shown an ammeter and at 12 a switch. This switch corresponds to the switch commonly employed to light or extinguish the lights in a motor vehicle, while at 13 is diagrammatically represented the rear light and at 14 the battery for furnishing the current for the lights. This battery 14 is connected to the ground 16 by a wire 17, while a wire 18 connects one side of the rear light 13 to the ground wire 17. A wire 19 connects this ground wire 17 with the electromagnet 6. The opposite side of this electromagnet is connected by a wire 21 to a contact 22. One side of the electromagnet 5 is connected by a wire 23 to the opposite side of the rear light 13, from that connected to the wire 18.

The opposite side of the electromagnet 5 is connected by a wire 24 to one side of the switch 12 from the opposite side of which switch a wire 26 connects with the ammeter 11, and also with one of the head-light wires 27, through a switch 30. The opposite side of these head-lights are grounded in the customary manner. A wire 25 connects the opposite side of the ammeter with the battery 14.

A wire 28 connects the wire 24 to one end of the pivoted armature 29. This armature is adapted to contact a spring 31 having one end supported on a bracket 32. The opposite end of this spring underlies the magnet 6 and normally rests upon a support 33, which spring also passes beneath the contact 22.

At 34, I have shown an actuating rod slidably supported by a bracket 36 and having a hand engaging ball 37. The bracket 33 is connected by a wire 38 to one side of the buzzer 7, while a wire 39 connects the opposite side of the buzzer 7 to the wire 19.

One side of each of the warning lights is connected by a wire 41 to the wire 39. The opposite sides of these lights are connected to the bracket 33, wire 38, and to wires 42 and 43, respectively.

In the modified form shown in Figure II the wiring of the automobile lights is identical with that just described, the only difference being that but one electromagnet, as for instance the magnet 5, is employed. The electromagnet is connected to the circuit in the same manner as above described, with the exception that a wire 44 is connected to the wire 23 and to a contact 46 positioned adjacent a contact 47, which contact is connected by a wire 48 to the wire 19.

Positioned so as to over-lie the electromagnet 5 and the contacts 46 and 47, is a pivoted armature 49 normally held in contact with the contact 51 by a spring 52. This armature is connected by a wire 53 to the bracket 32, while the contact 51 is connected by a wire 54 to one side of each of the warning lights 8 and 9, while the opposite sides of each of the warning lights are connected by a wire 56 to the opposite side of the buzzer 7.

An actuating rod similar to that described in Figure 1 and designated by the numeral 34 is employed to depress the armature 49, and therefore bears the same reference numerals.

The manner of operating my device is as follows:—

Assuming that the switch 12 has been closed so as to light the lights of the automobile, the current will flow from the battery 14, through wire 25, ammeter 11, wire 26, to switch 30, thence by wire 27 to headlight, and back to ground. The current will also flow from the wire 26, through the switch 12, wire 24, to one side of the electromagnet 5, by wire 23, to rear light 13 and by wire 18 back to ground. The flow of current through the electromagnet 5 will cause the armature 29 to rise and be held thereby as long as the rear light is lit. Should this light become extinguished for any reason, the lack of flow of current through the electromagnet 5 will cause the armature 29 to drop and contact the end of the spring 31. This will immediately cause the current to then pass from the armature 29, to spring 31, to bracket 33, through wire 38, buzzer 7, wire 39, wire 19, back to the ground, thus causing the buzzer to give an audible signal. At the same time, the current will pass through the wires 42 and 43 to the respective warning lights 8 and 9, and thence by wire 41 and wire 39 to wire 19, and back to the ground thus giving a visible signal.

Should the operator desire to stop a signal, that is, silence the buzzer and extinguish the warning lights 8 and 9, he presses upwardly on the handle 37 of the rod 34, which will cause the spring 31 to come in contact with the contact 22. This establishes a circuit through the electro magnet 6, to wire 19, and then to the ground, which results in the end of the spring 31 being held by the magnetism of the electromagnet 6, thus keeping the circuit closed and breaking the circuit to the warning lights 8 and 9 and the buzzer 7.

In the modified form shown in Figure II, the action is identical with the exception that the electromagnet 6 has been eliminated and an armature 49 substituted, which armature over-lies contacts 46 and 47 and magnet 5. The result of this construction being that the rear light upon becoming extinguished will cause the dropping of the armature 29, and will close the circuit to the bracket 32, and thence by wire 53, to armature 49, to contact 51, and by wire 54 to the auxiliary lights 8 and 9, and buzzer 7, thence by wire 39 to wire 19 and to the ground. In this modified form, the depressing of the rod 34 will move the armature 49 out of contact with the contact 51 in such a manner as to cause the contacts 47 and 46 to contact each other, which will establish a circuit from the wire 44 through contacts 46 and 47 and wire 48 to wire 19 and to the ground. The establishing of this circuit results in the current again flowing through the electromagnet 5, which will hold the armature 49 in a depressed position and will break the circuit to the buzzer 7 and auxiliary lights 8 and 9.

Should the driver store his car or at any time open the switch 12, the next time the switch is closed, the audible and visible signals will again warn him that he has not repaired the rear light, therefore it is impossible for a driver to overlook for any length of time, the fact that his rear light has become extinguished.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention, I claim.—

In a signaling system of the character described, the combination with a light of a motor vehicle and a control switch of said light, of a circuit therefor, an electromagnet in said circuit, an armature arranged to be attracted by said electromagnet which is energized when the light is functioning properly and the switch thereof is closed, a second circuit having the armature therein, an electrically conducting means having one end supported in the path of the armature and being in the circuit therewith, a signaling means in the second circuit, means in electrical connection with the signaling means and normally in contact with the opposite end of said electrically conducting means whereby when the light circuit is broken otherwise than by opening the switch the elctromagnet will be deenergized and drop the armature for contact with the electrically conducting means and thereby close the second circuit to the signaling means, said second circuit being closed to the signaling means until the switch is opened and upon closing said switch the signaling means will again function, means for breaking said second circuit by manually moving said electrically conducting means out of contact with the means in electrical connection with the signaling means and means for holding the electrically conducting means in its last mentioned position to retain the second circuit broken.

In testimony whereof I affix my signature.

WILFRED E. BLECHSCHMIDT.